(12) United States Patent
Bahlmann et al.

(10) Patent No.: US 11,078,603 B2
(45) Date of Patent: Aug. 3, 2021

(54) METHOD FOR CONTROLLING DISPLAYS OF A SPINNING MACHINE OR WINDER

(71) Applicant: Maschinenfabrik Rieter AG, Winterthur (CH)

(72) Inventors: Bernd Bahlmann, Schrobenhausen (DE); Mario Maleck, Walting (DE); Franz Huettinger, Geisenfeld (DE)

(73) Assignee: Maschinenfabrik Rieter AG, Winterthur (CH)

(*) Notice: Subject to any disclaimer, the term of this patent is extended or adjusted under 35 U.S.C. 154(b) by 289 days.

(21) Appl. No.: 16/242,559

(22) Filed: Jan. 8, 2019

(65) Prior Publication Data
US 2019/0211480 A1    Jul. 11, 2019

(30) Foreign Application Priority Data
Jan. 9, 2018    (DE) .................... 10 2018 100 362.5

(51) Int. Cl.
| | |
|---|---|
| *D01H 3/26* | (2006.01) |
| *B65H 63/00* | (2006.01) |
| *B65H 63/04* | (2006.01) |
| *B65H 54/22* | (2006.01) |
| *D01H 13/32* | (2006.01) |
| *G05B 23/02* | (2006.01) |

(Continued)

(52) U.S. Cl.
CPC .............. *D01H 3/26* (2013.01); *B65H 54/22* (2013.01); *B65H 63/00* (2013.01); *B65H 63/04* (2013.01); *D01H 13/32* (2013.01); *G05B 23/0272* (2013.01); *G06F 3/04817* (2013.01); *G06F 3/04886* (2013.01); *G06F 3/1423* (2013.01); *B65H 2701/31* (2013.01)

(58) Field of Classification Search
CPC . D05B 27/08; G06F 3/04886; G06F 3/04817; G05B 2219/31475; G05B 2219/31476; D01H 3/26; D01H 13/32; B65H 63/00
USPC ........................................ 700/130–131, 139
See application file for complete search history.

(56) References Cited

U.S. PATENT DOCUMENTS 6,574,526 B1 *  6/2003  Gaukler ................... D01H 1/16
                                                                700/139

FOREIGN PATENT DOCUMENTS

| DE | 199 30 714 A1 | 1/2001 |
|---|---|---|
| DE | 10 2006 045 237 A1 | 4/2008 |

(Continued)

OTHER PUBLICATIONS

German Patent Office Search Report, dated Nov. 9, 2018.
EP Search Report, dated Jun. 14, 2019.

*Primary Examiner* — Nathan E Durham
(74) *Attorney, Agent, or Firm* — Dority & Manning, P.A.

(57) ABSTRACT

A method for controlling a display on a spinning machine or winder having a plurality of same-kind workstations and a plurality of displays includes assigning one of the displays to at least two of the workstations, wherein each display includes a display area. During normal operation of the workstations, information regarding the individual workstations assigned to the particular display is simultaneously displayed in respective subareas of the display area. When required by changed operating states at the work stations, a surface area of the subareas is changed to display information regarding at least one of the workstations on a larger subarea. An associated spinning machine or winder is also provided.

17 Claims, 3 Drawing Sheets

(51) Int. Cl.
   *G06F 3/0481*     (2013.01)
   *G06F 3/0488*     (2013.01)
   *G06F 3/14*       (2006.01)

(56)            References Cited

FOREIGN PATENT DOCUMENTS

DE    10 2013 011 921 A1    1/2015
   DE    10 2017 110 572 A1    11/2017
   EP         1 065 303 A1     1/2001
   EP         2 826 899 A1     1/2015
   JP        S61 100807 A      5/1986
   WO        WO-9509387 A1 *   4/1995   ......... G05B 19/0426

* cited by examiner

METHOD FOR CONTROLLING DISPLAYS OF A SPINNING MACHINE OR WINDER

FIELD OF THE INVENTION

The present invention relates to a method for controlling displays of a spinning machine or winder comprising a plurality of workstations of the same kind and multiple displays, wherein one display is assigned in each case to multiple workstations. Moreover, the invention relates to an appropriate spinning machine or winder.

BACKGROUND

Textile machines, in particular, spinning machines or winders having a plurality of workstations of the same kind, at each of which a thread is produced and/or is rewound from one sleeve to another sleeve, are known. It is also known to operate these types of workstations more or less independently of one another. This independence also results in a need for the independent maintenance and control of every individual workstation. For this reason, it is necessary to provide the operating personnel with information regarding the particular workstations.

For this purpose, DE 199 30 714 A1 describes a textile machine comprising workstations, each of which includes an individual control system and at least one individual display device, wherein the display device includes, for example, a display for displaying maintenance- and performance-related information. Equipping each individual spinning position with a display requires production-engineering effort and results in higher costs. In contrast thereto, DE 10 2013 011 921 A1 describes a ring spinning machine comprising display means for displaying malfunctions of the spinning positions, wherein two adjacent spinning positions share one display means, for example. However, the display means described here displays only that there is a problem at one of the two spinning positions, but does not indicate at which one. This must be ascertained by the operating personnel.

SUMMARY OF THE INVENTION

A problem addressed by the present invention is therefore that of providing a method, with the aid of which a simple and cost-effective display of information related to the particular workstations is possible without reducing the information content available for the operating personnel. Additional objects and advantages of the invention will be set forth in part in the following description, or may be obvious from the description, or may be learned through practice of the invention.

The problems are solved using a method and a spinning machine or winder including the features set forth herein.

In the method provided here for controlling a display at a spinning machine or winder including a plurality of workstations of the same kind and multiple displays, one display is assigned in each case to multiple workstations.

It is provided, during a normal operation of the workstations assigned to one display, that the display displays information regarding several of the workstations assigned to the display, wherein the information regarding the individual workstations is displayed in each case on a subarea of the display, and the surface area of the particular subareas is changed as necessary. In this content, "normal operation" means thread production or winding within regular operating parameters without malfunction and apart from a start-up or shutdown of the relevant workstation.

In contrast to equipping each individual workstation with a display, in the case of the provided method, at least every second display can be dispensed with. In addition, due to the subdivision of the display into subareas, information regarding all workstations assigned to the display can be displayed simultaneously. A possible loss of information content due to the reduced display area as compared to a display to which only one workstation is assigned is compensated for, due to the fact that the surface area of the particular subareas can be changed as necessary. For example, during normal operation, only the most important information regarding each workstation assigned to the relevant display is displayed. On the other hand, upon exiting the normal operation of a workstation, the surface area of the subarea assigned to this workstation is enlarged. Finally, additional information is displayed on the enlarged area. The content and/or the size of the subareas could also be changed by way of the intervention by operating personnel and, therefore, additional information could be made accessible.

Preferably, one common display is assigned in each case to two adjacent workstations, with the aid of which information regarding each of the two workstations can be displayed.

It is particularly advantageous, during normal operation, when the display displays the state, in particular, the maintenance requirement, of the workstations assigned thereto. It is helpful for the operating personnel of a textile machine to be able to assess the state of each workstation at a glance. Such a state could be, for example, a certain section of a manufacturing process or, in particular, the occurrence of an error during the operation of a workstation. In addition, information regarding the presently spun or rewound yarn or the progress of the on-going spinning or winding process could be displayed. It would also be conceivable that the display is switched off during the normal operation of all assigned workstations and is activated only upon occurrence of a new state at one of the assigned workstations.

Moreover, it is advantageous when the information regarding the workstations assigned to a display and/or the association of the subareas with the workstations are/is indicated with the aid of icons. Icons which are recognizable even from a large distance are a great advantage in terms of the quick assessment of the state of the workstations by the operating personnel. In addition, icons can represent complex interrelationships even on a small area. For example, an exclamation point could symbolize the occurrence of a problem, wherein further icons could display the type of problem. The association of a subarea of the display with a workstation can also be represented by icons in a way that is easy to understand. For example, arrows pointing in the direction of that workstation for which information is displayed on the relevant subarea could clearly indicate this association.

Advantageously, the surface area of the subareas of a display and/or the type of information displayed by the display are/is changed, as necessary, manually or with the aid of a display controller assigned to the display, in particular, on the basis of defined states of the workstations. The need described here can occur, for example, when operating personnel require access to information which is not displayed during a normal operation of the workstations. In such a case, it would be advantageous when the type of displayed information as well as the surface area of a relevant subarea are changed by way of manual intervention by the operating personnel in order to ensure that the additional information is displayed in a clearly laid-out manner. It would be conceivable to retrieve a maintenance history of a workstation in this way. In addition, a display controller is advantageous, which automatically triggers a change of the representation on a display, for example, during the occurrence of errors at a workstation assigned to the display. As a result, the operating personnel can be efficiently notified about an intervention, which may be necessary. Alternatively, it would be conceivable to periodically change the displayed information and/or the surface areas of the subareas at certain time intervals.

It is advantageous when the subareas of a display, each of which is assigned to a workstation, are represented in the same size during normal operation. This ensures that the operating personnel has a good overview of information regarding each workstation.

It is also advantageous when the type of information displayed in at least one subarea of the display and/or the surface area of at least one subarea with respect to the total area of the display can be changed by way of inputs entered on an input means, which is assigned to a display or by way of a touch-sensitive display. This enables the operating personnel to have clearly laid-out access to all information made available by the workstations. In addition to a touch-sensitive display, in particular, one or several multi-function control buttons or a keyboard and/or a mouse are possible forms of an input means.

According to an advantageous embodiment of the method, at least one workstation assigned to the display is controlled by way of inputs entered on an input means assigned to the display, in particular, a touch-sensitive section of the display. This makes it possible for the operating personnel to individually intervene into the workflow of each individual workstation. It would be conceivable to change manufacturing properties or to adjust working speeds up to the manual shutdown of individual workstations by way of appropriate inputs. In particular, a supplemental control by way of inputs in addition to a higher-order automatic control would be advantageous.

It is particularly advantageous when the surface area of a subarea with respect to the total display area of the display is increased to at least 70% by way of an input and/or with the aid of a display controller assigned to the display. In order to display the information regarding a certain workstation for the operating personnel in a clearly laid-out manner, for example, in the event of a malfunction, it is advantageous to enlarge the surface area of the subarea assigned to this workstation so that the surface area encompasses a large extent of the total display area. Values of 70% and higher are an advantageous extent. For example, the entire display area could also be temporarily assigned to a workstation.

Moreover, it is of great advantage for a spinning machine or winder having a plurality of workstations of the same kind and multiple displays, wherein one display is assigned in each case to multiple workstations, when a display controller is assigned to the display, which is designed for controlling the display according to the preceding description or the following description. This makes it possible to reduce the total number of required displays as compared to an arrangement of one display per workstation without a loss of information for the operating personnel. For example, by assigning two workstations in each case to one display which is controlled according to the method as described above, the total number of displays is reduced by a half. Further savings could result, for example, from an assignment of three or four workstations in each case to one display.

In addition, it is advantageous for the spinning machine or winder when the display controller is designed for controlling the display in such a way that the display—during the normal operation of the workstations assigned thereto—displays the state, in particular, the maintenance requirement, of the workstations. This makes it possible for the operating personnel to quickly assess the state of the particular workstations and allows for an advantageous planning of workflows.

It is of great advantage for the spinning machine or winder when the display controller is designed for controlling the display in such a way that the information regarding the workstations assigned to a display and/or the association of the subareas of the display with the particular workstations are/is represented in entirety or in part by icons. Icons can convey a greater areal density of information as compared to numbers and letters and, therefore, are particularly well-suited for saving display area while providing the same information content.

It is of particular advantage for the spinning machine or winder when the display controller is designed for controlling the display in such a way that the surface area of the particular subareas of the display, each of which is assigned to a display, is changed. Changing the surface area of the individual subareas as necessary makes it possible, for example, to retrieve additional information in a clearly laid-out manner or to alert personnel in the event of a malfunction. Preferably, the type of information displayed by the display (for example, state, efficiency, maintenance history) can also be changed, additionally or alternatively, manually or by way of the display controller. In particular, it can be advantageous to carry out the change due to defined states (for example, malfunction, next work step, end of a lot) of the workstation.

It is advantageous for the spinning machine or winder when the display controller is designed for controlling the display in such a way that the surface areas of the subareas assigned to the workstations are represented in the same size during a normal operation of these workstations. This simplifies the overview and facilitates the detection of workstations outside the normal operation. Alternatively, a periodic change of the size of the subareas or a shutoff of the display during the normal operation of the workstations assigned to the display would be conceivable.

It is also advantageous for the spinning machine or winder when an input means, in particular, a touch-sensitive section of the display, is assigned in each case to a display, with the aid of which the type of information displayed by the display in at least one subarea and/or the surface area of at least one subarea with respect to the total area of the display are/is changed. Due to this type of input means, in particular, in the direct proximity of the display, it becomes possible for the operating personnel to retrieve, for example, additional information quickly and in a clearly laid-out manner. In addition to a touch-sensitive section of the display or, for example, a separate touchscreen, one or several multi-function control buttons or a keyboard and/or a mouse would be conceivable as an input means.

In addition, it is advantageous for the spinning machine or winder when an input means, in particular, a touchscreen, is assigned in each case to a display, with the aid of which at least one workstation assigned to the display is controlled. The possibility of carrying out a control at the location of the workstations facilitates the maintenance and the temporary adaptation of operating parameters by the operating personnel. In this case, the display can immediately convey the effects of the interventions to the operating personnel. If an input means is available for manipulating the display, it would be advantageous to also utilize the input means for controlling the workstations. Preferably, the control supplements a higher-order automatic control system by way of the input means.

It is advantageous for the spinning machine or winder when the display controller is designed for controlling the display in such a way that the surface area of a partial surface with respect to the total display area of the display is increased in each case to at least 70% by way of an input and/or automatically. In the event of a need to represent additional information regarding a workstation, it is advantageous when a large part of the display area is allotted to the surface area assigned to this workstation. This contributes, first and foremost, to clarity and to the time efficiency of the operating personnel. Preferably, the entire display area or the entire portion of the display area is allotted to a workstation, which displays workstation-specific information as necessary. In addition, an area can be provided, which relates to the machine as a whole or to individual sections thereof.

It is also advantageous for the spinning machine or winder when the display controller and/or the input means and/or the display form/forms a unit. The unit comprising the input means and the display would be given, for example, in the case of a touchscreen. Accommodating the display controller, for example, in the housing of the display would be advantageous due to the space savings.

Preferably, the displays are fixedly connected to the spinning machine or winder. In particular, a fixing at a height of 1 m to 1.5 m above the floor would be advantageous in terms of the usability by the personnel. Moreover, the displays can be designed, for example, as a liquid crystal display (LCD). The display of various colors by the displays would be advantageous for an additional depth of information. The displays could have, in particular, a rectangular shape and, for example, edge lengths from 4 cm to 20 cm. Preferably, the displays and/or the display controllers are electronically connected to the central control system of the spinning machine or winder.

BRIEF DESCRIPTION OF THE DRAWINGS

Further advantages of the invention are described in the following exemplary embodiments. Wherein.

DETAILED DESCRIPTION

Figure 1:
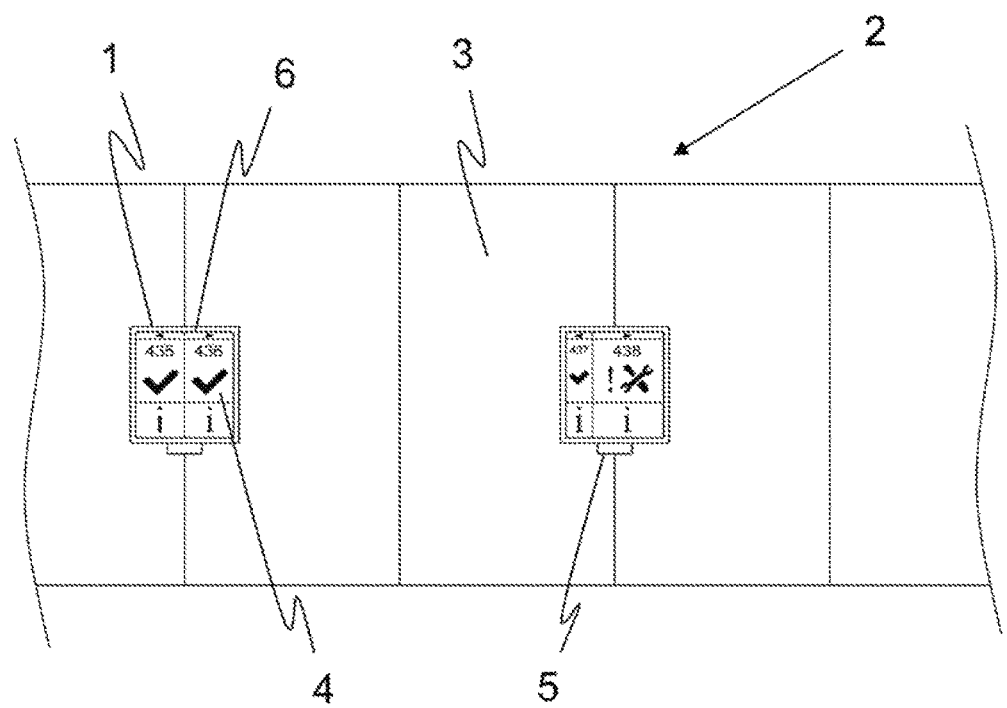
FIG. 1 shows a section of the front view of a spinning machine comprising one display for every two workstations.

Reference will now be made to embodiments of the invention, one or more examples of which are shown in the drawings. Each embodiment is provided by way of explanation of the invention, and not as a limitation of the invention. For example features illustrated or described as part of one embodiment can be combined with another embodiment to yield still another embodiment. It is intended that the present invention include these and other modifications and variations to the embodiments described herein.

In the following description of the figures, the same reference signs are utilized for identical and/or at least comparable features in each of the various figures. The individual features, their embodiment and/or mode of operation are explained in detail mostly only upon the first mention thereof. If individual features are not explained in detail once more, their embodiment and/or mode of operation correspond/corresponds to the embodiment and mode of operation of the features, which are equally-acting and have the same name and have already been described above.

As represented in FIG. 1, a display 1 on a spinning machine or winder 2 is assigned in each case to two workstations 3. The control of the displays 1 is ensured in each case by a display controller 5. Due to the subdivision of the display areas into multiple subareas 4, it is possible to display information regarding each workstation 3 and simultaneously reduce the total number of displays 1 as compared to an assignment of a display 1 to each workstation 3.

Due to the display of icons (additionally or alternatively to numbers and letters) by the displays 1, it is easier for the operating personnel of the spinning machine or winder 2 to be able to quickly assess the state of the workstations 3 even from a distance. In the case of a malfunction of a workstation 3, the display controller 5 can trigger the enlargement of the relevant subarea 4 and the display of an error message, which signals to the operating personnel whether an intervention is necessary.

Figure 3:
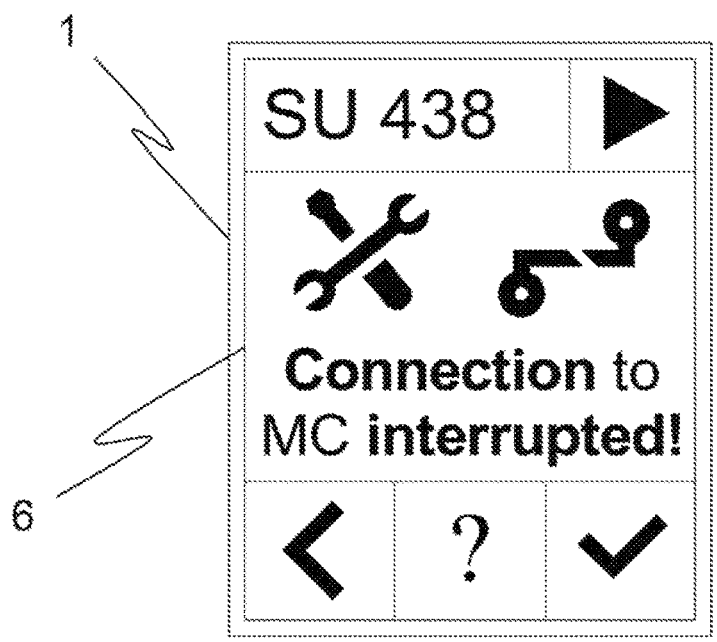
FIG. 3 shows an enlarged view of a display during retrieval of error information.

In addition, it would be conceivable to display the error message in a flashing manner or to provide the relevant subarea 4 with a colored background if, for example, a prompt intervention by the personnel is necessary. Due to the fact that the display 1 is equipped with a touch-sensitive section 6 which can surround, in particular, the entire surface of the display 1, it is possible for the personnel to retrieve additional information, such as an extensive error description (see FIG. 3), without any additional input means, by touching appropriate areas of the display 1.

Figure 2:
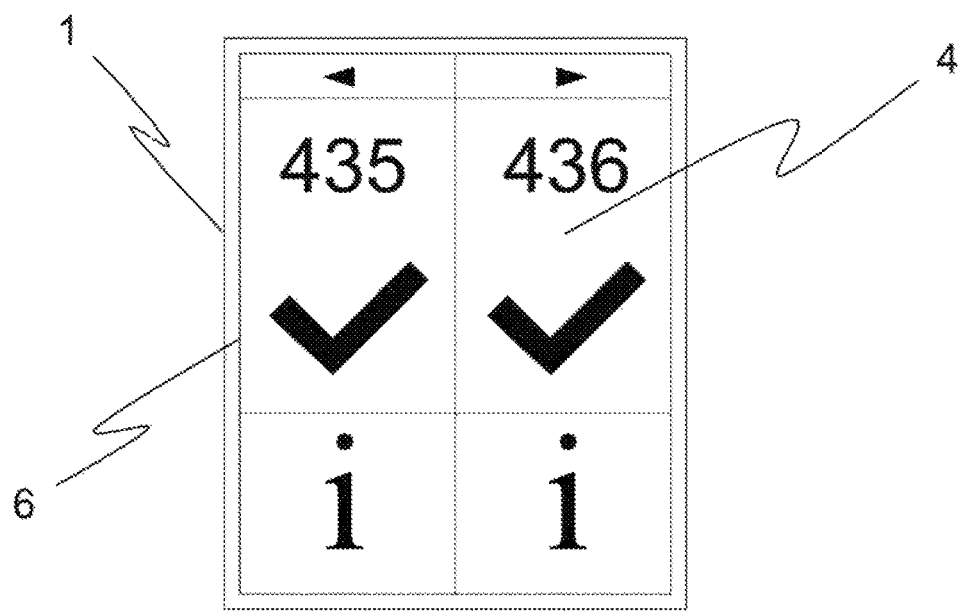
FIG. 2 shows an enlarged view of a display during normal operation.

FIG. 2 shows the enlarged view of the display 1 during normal operation of the workstations 3 assigned to the display 1. Preferably, appropriate icons display the normal operation for both workstations 3 in a way, which is easy to understand. In this case, the subareas 4 are of the same size, for example, and so the information regarding both workstations 3 can be clearly displayed. The association of the subareas 4 to the particular workstations 3 is represented, by way of example, by numbering as well as with the aid of icons in the form of arrows in the upper region of the display 1. By way of the personnel touching a touch-sensitive section 6, for example, in the lower region of the display 1, additional information regarding the particular workstation 3 can be displayed (see FIGS. 4 and 5).

FIG. 3 shows, once again, the enlarged view of the display 1, wherein the effects of the personnel having touched the error message represented in FIG. 1 are shown here by way of example. Preferably, the entire display area is now assigned only to the workstation 3, which has the malfunction. The assignment is clearly apparent, for example, by way of the designation of the workstation 3 and an enlarged arrow shown in the upper region of the display 1. A possible description in words as well as an icon-based representation, which may be present clarify the malfunction occurring at the workstation 3.

By way of touching appropriate areas on the touch-sensitive section 6, it is possible for the personnel, for example, to retrieve additional information related to the malfunction or to reset the display 1 to the initial state. Alternatively to the enlargement of the relevant subarea 4 so as to encompass the total area of the display as represented here, it would also be possible to continue displaying the state of the second workstation 3 assigned to the display 1 in a small subarea 4 of the display 1 even in the representation of the detailed error description.

Figure 4:
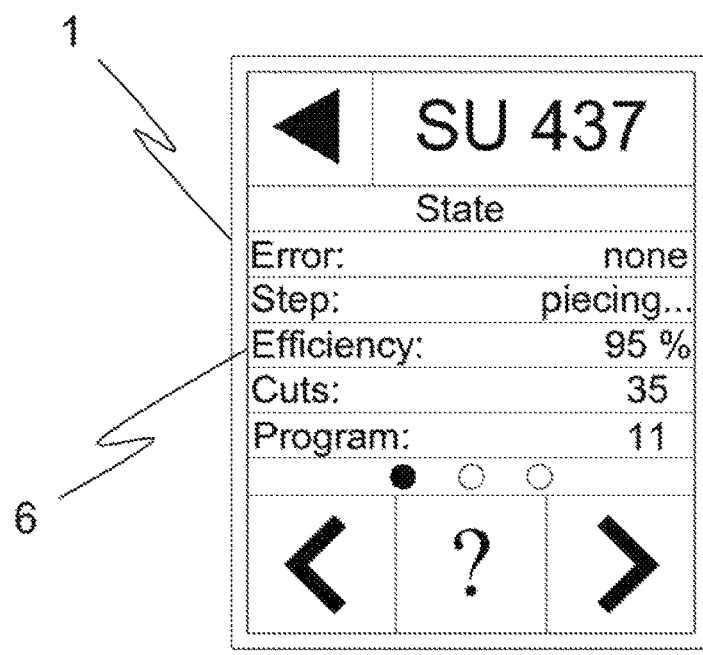
FIG. 4 shows an enlarged view of a display during retrieval of status information.

FIG. 4 shows an example of additional information which is retrieved by the operating personnel by touching the relevant fields of the touch-sensitive section 6 represented in FIGS. 1 and 2. The relevant subarea 4 is enlarged so as to encompass the total area of the display 1, for example, wherein the association is preferably apparent in the upper region of the display 1, by way of example, the designation of the workstation 3 and an arrow icon. An overview shows general information regarding the status of the workstation 3, such as the work step, in which the workstation 3 is in, or the efficiency with which the workstation 3 operates. It is clearly shown here that the variable size of the subareas 4 prevents a loss of information and an overview while simultaneously saving the number of displays 1, since the display 1 behaves, for example, temporarily as if it were assigned to only one individual workstation 3.

Figure 5:
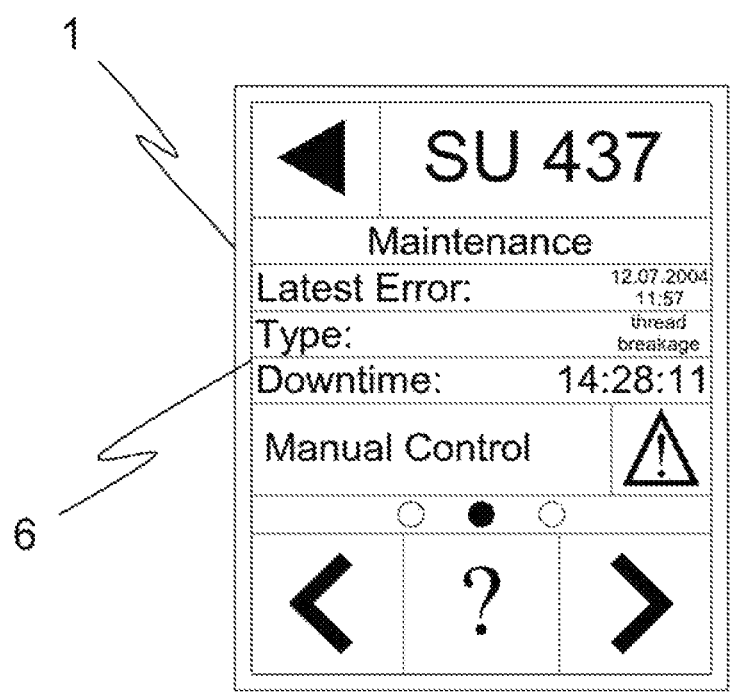
FIG. 5 shows an enlarged view of a display during retrieval of maintenance information.

By touching appropriate fields of the touch-sensitive section 6 of the display 1, the personnel can, for example, retrieve more detailed information regarding the status of the workstation 3 or switch to other categories (see FIG. 5).

FIG. 5 shows an example of a further category of additional information. In this case, exemplary maintenance information regarding the workstation 3 is displayed. This information includes, for example, the point in time of the latest error or the accumulated downtime of the workstation 3. By touching an appropriate field of the touch-sensitive section 6, the operating personnel can retrieve, for example, a menu for the manual control of the workstation 3. As a result, the workstation 3 could be shut down, for example, on-site. By touching other fields, more detailed information can be retrieved or a switch to other categories can be carried out, as before.

The present invention is not limited to the represented and described exemplary embodiments. Modifications within the scope of the claims are also possible, as is any combination of the features, even if they are represented and described in different exemplary embodiments.

LIST OF REFERENCE CHARACTERS 1 display
2 spinning machine or winder
3 workstation
4 subarea
5 display controller
6 touch-sensitive section

The invention claimed is:

1. A method for controlling a display on a spinning machine or winder having a plurality of same-kind workstations and a plurality of displays, comprising:
assigning one of the displays to at least two of the workstations, each display comprising a display area;
during normal operation of the workstations, displaying information on each of the displays regarding the workstations assigned to the display, wherein the information regarding the workstations is simultaneously displayed on separate subareas of the display area assigned to each of the workstations; and
when required by changed operating states at the workstations, changing a surface area of the subareas to display information regarding at least one of the workstations on a larger subarea.

2. The method as in claim 1, wherein during normal operation, the displays display an operating state of the workstations assigned thereto.

3. The method as in claim 1, wherein the information regarding the individual workstations assigned to the displays in the subareas is represented by icons.

4. The method as in claim 1, wherein the surface area of the subareas is changed manually or by a controller assigned to the display based on the changed operating states.

5. The method as in claim 1, wherein during normal operation the surface area of the subareas is the same.

6. The method as in claim 1, wherein a type of the information displayed in the subareas or the surface area of the subareas is changed via input means assigned to the display.

7. The method as in claim 6, wherein the input means comprises a touch-sensitive section of the display and the workstations assigned to the display are controlled by the input means.

8. The method as in claim 6, wherein the surface area of the changed subarea is increased to at least 70% of the display area via the input means or a controller assigned to the display.

9. A spinning machine or winder, comprising:
a plurality of same-kind workstations;
a plurality of displays, wherein each display comprises a display area and is assigned to at least two of the workstations;
a controller assigned to each display, the controller configured to control the display such that during normal operation of the workstations, information regarding the workstations assigned to each display is simultaneously displayed in separate subareas of the display area and, when required by changed operating states at the workstations, a surface area of the subareas is changed to display information regarding at least one of the workstations on a larger subarea.

10. The spinning machine or winder as in claim 9, wherein the controller is configured to display an operating state of the workstations on the display during normal operation.

11. The spinning machine or winder as in claim 9, wherein the controller is configured such that the information regarding the workstations assigned to the displays in the subareas is represented by icons.

12. The spinning machine or winder as in claim 9, wherein the controller is configured such that the surface area of the subareas or type of the information displayed in the subareas is changed manually or via the controller assigned to the display based on the changed operating states of the workstations.

13. The spinning machine or winder as in claim 9, wherein the controller is configured such that, during the normal operation, the surface area of the subareas is the same.

14. The spinning machine or winder as in claim 9, further comprising input means assigned to the display, wherein a type of the information displayed in the subareas or the surface area of the subareas is changed via the input means.

15. The spinning machine or winder as in claim 14, wherein the input means comprises a touch-sensitive section, and wherein the controller is configured such that control of the workstations assigned to the display is rendered via the display.

16. The spinning machine or winder as in claim 14, wherein the controller is configured such that the surface area of the changed subarea is increased to at least 70% of the display area via the input means or automatically by the controller.

17. The spinning machine or winder as in claim 14, wherein the controller, the input means, and the display are configured as a single unit.

* * * * *